United States Patent
Leno et al.

(10) Patent No.: US 9,763,079 B2
(45) Date of Patent: Sep. 12, 2017

(54) SYSTEM AND METHOD FOR COMMUNICATION HISTORY RECONCILIATION AMONGST LINKED DEVICES

(71) Applicant: VONAGE NETWORK LLC, Holmdel, NJ (US)

(72) Inventors: Brian Grady Leno, New York, NY (US); Tzahi Efrati, Hoboken, NJ (US); Jaya Meghani, Old Bridge, NJ (US)

(73) Assignee: Vonage Business Inc., Atlanta, GA (US)

( * ) Notice: Subject to any disclaimer, the term of this patent is extended or adjusted under 35 U.S.C. 154(b) by 204 days.

(21) Appl. No.: 14/339,805

(22) Filed: Jul. 24, 2014

(65) Prior Publication Data

US 2016/0029202 A1    Jan. 28, 2016

(51) Int. Cl.
| | |
|---|---|
| *H04M 11/00* | (2006.01) |
| *H04W 8/18* | (2009.01) |
| *H04L 29/06* | (2006.01) |
| *H04M 3/42* | (2006.01) |
| *H04W 4/16* | (2009.01) |
| *H04M 3/46* | (2006.01) |
| *H04M 3/22* | (2006.01) |

(52) U.S. Cl.
CPC ............ *H04W 8/18* (2013.01); *H04L 65/1006* (2013.01); *H04M 3/42102* (2013.01); *H04M 3/42263* (2013.01); *H04W 4/16* (2013.01); *H04M 3/2218* (2013.01); *H04M 3/465* (2013.01); *H04M 2203/551* (2013.01)

(58) Field of Classification Search
CPC ....................................................... H04W 8/18
See application file for complete search history.

(56) References Cited

U.S. PATENT DOCUMENTS

| | | | | |
|---|---|---|---|---|
| 5,904,013 A | * | 5/1999 | Greenspan | H04M 3/46 379/211.04 |
| 2003/0185365 A1 | | 10/2003 | Mansfield | |
| 2012/0233327 A1 | * | 9/2012 | Smith | H04L 65/1006 709/225 |
| 2015/0237198 A1 | * | 8/2015 | Bouvet | H04M 3/2218 370/259 |

FOREIGN PATENT DOCUMENTS

WO    WO-2014/033378 A1    3/2014

OTHER PUBLICATIONS

International Search Report and Written Opinion mailed Oct. 30, 2015 for Application No. PCT/US2015/040757, 10 pages.

* cited by examiner

*Primary Examiner* — Justin Lee
(74) *Attorney, Agent, or Firm* — Moser Taboada; Joseph Pagnotta

(57) ABSTRACT

Methods and systems for communication history reconciliation amongst linked devices are provided herein. In some embodiments, a method for communication history reconciliation amongst linked devices may include receiving an incoming communication request directed to a communication identifier associated with a user account, transmitting the communication request to at least a first device and a second device associated with the user account, receiving, responsive to the communication request, a message from the first device indicating that the first device has accepted the communication request to establish a call, and transmitting, to the second device, an indication that the communication request was accepted by the first device.

25 Claims, 6 Drawing Sheets

SYSTEM AND METHOD FOR COMMUNICATION HISTORY RECONCILIATION AMONGST LINKED DEVICES

BACKGROUND

Field

Embodiments of the present invention generally relate to systems and methods for communication history reconciliation amongst linked devices.

Description of the Related Art

Some telephony service providers, such as Voice over Internet Protocol (VoIP) service providers, allow subscribers to register a plurality of telephony devices with a single telephony account. A communication identifier, such as a telephone number, may be associated with the telephony account (referred to herein as a multi-device user account). When the communication identifier is called/dialed by a third party, each of the registered devices may simultaneously ring, thus linking the devices with the communication identifier. That is, incoming calls from the third party are simultaneously directed to each of the registered devices When the call is answered by one of the plurality of registered devices, the telephony service provider will signal the other registered devices associated with the account to stop ringing. However, all the registered devices which were not used to answer the call will display a missed call in their call histories. Due to the fact that the call was actually accepted by the user on one of the registered devices, a missed call entry on any user device of the user is an inaccurate record of the call.

Thus, there is a need for improved systems and methods for communication history reconciliation amongst linked devices.

SUMMARY

Methods and systems for communication history reconciliation amongst linked devices are provided herein. In some embodiments, a method for communication history reconciliation amongst linked devices may include receiving an incoming communication request directed to a communication identifier associated with a user account, transmitting the communication request to at least a first device and a second device associated with the user account, receiving, responsive to the communication request, a message from the first device indicating that the first device has accepted the communication request to establish a call, and transmitting, to the second device, an indication that the communication request was accepted by the first device.

In some embodiments, a method for communication history reconciliation amongst linked devices may include receiving at a first device an incoming communication request directed to an identifier associated with a user account; receiving an instruction to terminate a communication associated with the communication request; receiving an indication that the communication request was accepted by a second device associated with the user account; and generating a call history record to indicate that the communication request was accepted by the second device.

In some embodiments, a system for communication history reconciliation amongst linked devices may include a call management system configured to receive an incoming communication request directed to an identifier associated with a user account; transmit the communication request to at least a first device and a second device associated with the user account; receive an acknowledgement to the communication request from the first device; transmit, to the second device an instruction to terminate a communication attempt associated with the communication request; and transmit, to the second device, an indication that the communication request was accepted by the first device.

In some embodiments, a system for communication history reconciliation amongst linked devices may include a first device, wherein the first device is associated with an identifier associated with a user account, wherein the user account is associated with a second device, wherein the first device is configured to receive at the first device an incoming communication request directed to an identifier associated with a user account; receive an instruction to terminate a communication associated with the communication request; receive an indication that the communication request was accepted by the second device associated with the user account; and generate a call history record to indicate that the communication request was accepted by the second device.

Other and further embodiments of the present invention are described below.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

Figure 1:
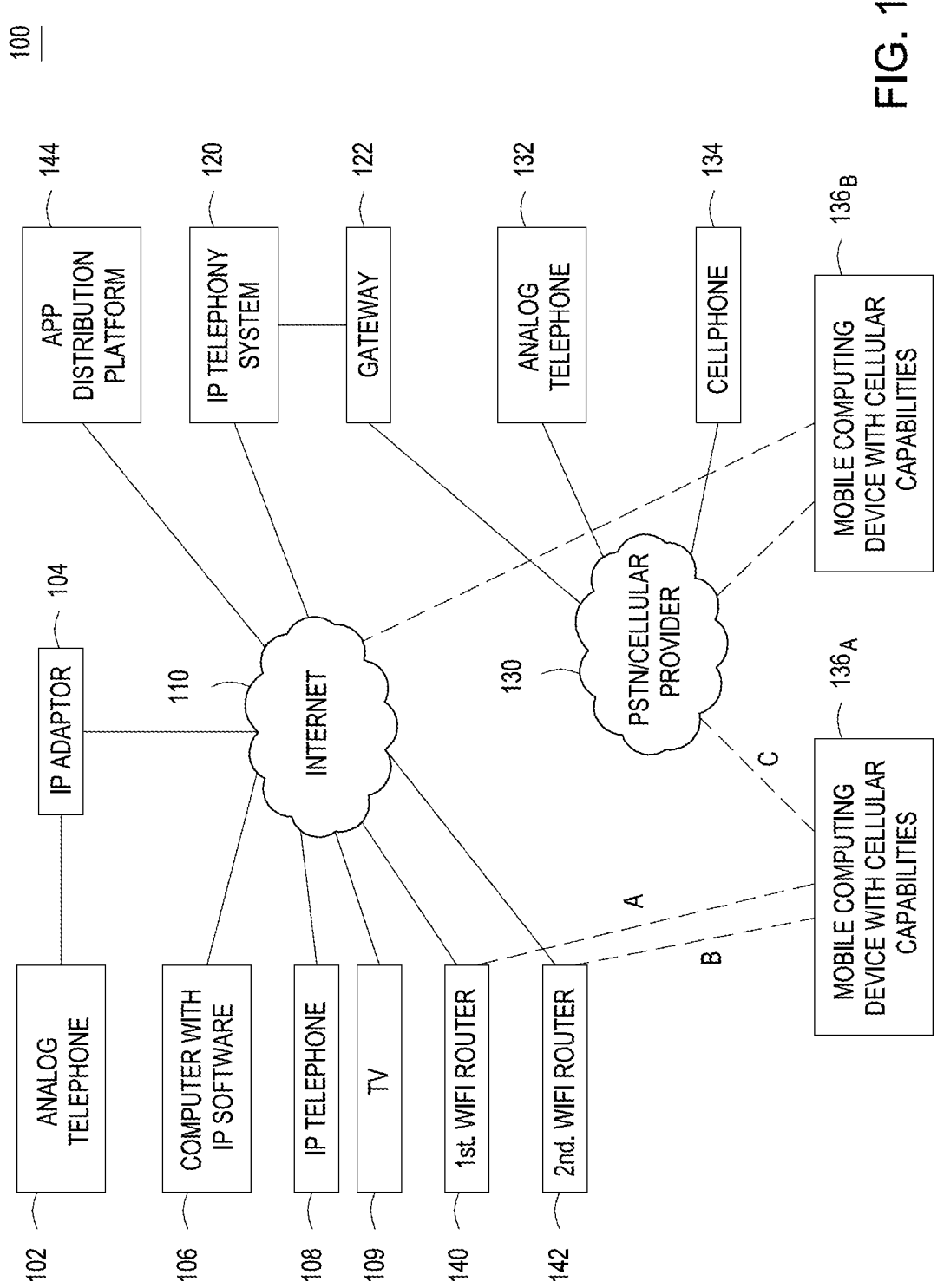
FIG. 1 depicts a block diagram of a telecommunication network, according to one or more embodiments of the invention.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DETAILED DESCRIPTION

Embodiments of the present invention generally relate to systems and methods for communication history reconciliation amongst linked devices. More specifically, embodiments of the present invention facilitate the management of call history logs of a plurality of devices that are linked to the same telephony service account. When a communication request is received to place a call to an identifier associated with a multi-device user account, the communication request is transmitted to each of the registered devices. For example, the communication request is transmitted to at least a first user device and one or more second user devices associated with the user account. After the user answers the call on the first user device, the one or more second user devices associated with the user account are sent a message indicating that the call was established with the first device (i.e., the call was answered by the user using the first device). In some embodiments, the one or more second devices do not log the call associated with the communication request as a missed call. In some embodiments, the one or more second user devices log the call in a call history log with an indication that the call was accepted by another device of the user, for example, the first user device. In some embodiments, the one or more second user devices are sent a message that includes call details such as call time, duration, and the like. In such embodiments, the one or more second user devices log the call information in the call history log, thereby indicating that the call was not missed, but rather was accepted by another device associated with the user.

Some portions of the detailed description which follow are presented in terms of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the following description, the terms VOIP system, VOIP telephony system, IP system and IP telephony system are all intended to refer to a system that connects callers and that delivers data, text and video communications using Internet protocol data communications. Those of ordinary skill in the art will recognize that embodiments of the present invention are not limited to use with IP telephony systems and may also be used in other systems.

As illustrated in FIG. 1, a communications environment 100 is provided to facilitate IP enhanced communications. An IP telephony system 120 enables connection of telephone calls between its own customers and other parties via data communications that pass over a data network 110. The data network 110 is commonly the Internet, although the IP telephony system 120 may also make use of private data networks. The IP telephony system 120 is connected to the Internet 110. In addition, the IP telephony system 120 is connected to a publicly switched telephone network (PSTN) 130 via a gateway 122. The PSTN 130 may also be directly coupled to the Internet 110 through one of its own internal gateways (not shown). Thus, communications may pass back and forth between the IP telephony system 120 and the PSTN 130 through the Internet 110 via a gateway maintained within the PSTN 130.

The gateway 122 allows users and devices that are connected to the PSTN 130 to connect with users and devices that are reachable through the IP telephony system 120, and vice versa. In some instances, the gateway 122 would be a part of the IP telephony system 120. In other instances, the gateway 122 could be maintained by a third party.

Customers of the IP telephony system 120 can place and receive telephone calls using an IP telephone 108 that is connected to the Internet 110. Such an IP telephone 108 could be connected to an Internet service provider via a wired connection or via a wireless router. In some instances, the IP telephone 108 could utilize a packet-switched network of a cellular telephone system to access the Internet 110.

Alternatively, a customer could utilize an analog telephone 102 which is connected to the Internet 110 via a telephone adapter 104. The telephone adapter 104 converts analog signals from the telephone 102 into data signals that pass over the Internet 110, and vice versa. Analog telephone devices include but are not limited to standard telephones and document imaging devices such as facsimile machines. A configuration using a telephone adapter 104 is common where the analog telephone 102 is located in a residence or business. Other configurations are also possible where multiple analog telephones share access through the same IP adaptor. In those situations, all analog telephones could share the same telephone number, or multiple communication lines (e.g., additional telephone numbers) may provisioned by the IP telephony system 120.

In addition, a customer could utilize a soft-phone client running on a computer 106 or a television 109 to place and receive IP based telephone calls, and to access other IP telephony systems (not shown). The computer 106 may be a personal computer (PC), a tablet device, a gaming system, and the like. In some instances, the soft-phone client could be assigned its own telephone number. In other instances, the soft-phone client could be associated with a telephone number that is also assigned to an IP telephone 108, or to a telephone adaptor 104 that is connected one or more analog telephones 102.

Users of the IP telephony system 120 are able to access the service from virtually any location where they can connect to the Internet 110. Thus, a customer could register with an IP telephony system provider in the U.S., and that customer could then use an IP telephone 108 located in a country outside the U.S. to access the services. Likewise, the customer could also utilize a computer outside the U.S. that is running a soft-phone client to access the IP telephony system 120.

A third party using an analog telephone 132 which is connected to the PSTN 130 may call a customer of the IP telephony system 120. In this instance, the call is initially connected from the analog telephone 132 to the PSTN 130, and then from the PSTN 130, through the gateway 122 to the IP telephony system 120. The IP telephony system 120 then routes the call to the customer's IP telephony device. A third party using a cellular telephone 134 could also place a call to an IP telephony system customer, and the connection would be established in a similar manner, although the first link would involve communications between the cellular telephone 134 and a cellular telephone network. For purposes of this explanation, the cellular telephone network is considered part of the PSTN 130.

In the following description, references will be made to an "IP telephony device." This term is used to refer to any type of device which is capable of interacting with an IP telephony system to complete an audio or video telephone call or to send and receive text messages, and other forms of communications. An IP telephony device could be an IP telephone, a computer running IP telephony software, a telephone adapter which is itself connected to a normal analog telephone, or some other type of device capable of communicating via data packets. An IP telephony device could also be a cellular telephone or a portable computing device that runs a software application that enables the device to act as an IP telephone. Thus, a single device might be capable of operating as both a cellular telephone that can facilitate voice based session calls, and an IP telephone that can facilitate data based session calls.

The following description will also refer to a mobile telephony device. The term "mobile telephony device" is intended to encompass multiple different types of devices. In some instances, a mobile telephony device could be a cellular telephone. In other instances, a mobile telephony device may be a mobile computing device, such as the APPLE IPHONE, that includes both cellular telephone capabilities and a wireless data transceiver that can establish a wireless data connection to a data network. Such a mobile computing device could run appropriate application software to conduct VoIP telephone calls via a wireless data connection. Thus, a mobile computing device, such as an APPLE IPHONE, a RIM BLACKBERRY or a comparable device running GOOGLE ANDROID operating system could be a mobile telephony device.

In still other instances, a mobile telephony device may be a device that is not traditionally used as a telephony device, but which includes a wireless data transceiver that can establish a wireless data connection to a data network. Examples of such devices include the APPLE IPOD TOUCH and the IPAD. Such a device may act as a mobile telephony device once it is configured with appropriate application software.

FIG. 1 illustrates that a mobile computing device with cellular capabilities 136A (e.g., a smartphone) is capable of establishing a first wireless data connection A with a first wireless access point 140, such as a WiFi or WiMax router. The first wireless access point 140 is coupled to the Internet 110. Thus, the mobile computing device 136A can establish a VOIP telephone call with the IP telephony system 120 via a path through the Internet 110 and the first wireless access point 140.

FIG. 1 also illustrates that the mobile computing device 136A can establish a second wireless data connection B with a second wireless access point 142 that is also coupled to the Internet 110. Further, the mobile computing device 136A can establish either a third wireless data connection C via a packet-switch network provided by a cellular service provider 130 using its cellular telephone capabilities, or establish a voice based session telephone call via a circuit-switched network provided by a cellular service provider 130. The mobile computing device 136A could also establish a VoIP telephone call with the IP telephony system 120 via the second wireless connection B or the third wireless connection C.

Although not illustrated in FIG. 1, the mobile computing device 136A may be capable of establishing a wireless data connection to a data network, such as the Internet 110, via alternate means. For example, the mobile computing device 136A might link to some other type of wireless interface using an alternate communication protocol, such as the WIMAX standard.

Similarly, mobile computing device with cellular capabilities 136B may also be coupled to internet 110 and/or cellular service provider 130. In some embodiments, mobile computing device 136B may be connected to internet 110 via a WIFI or WIMAX connection, and the like, and can also establish a VOIP telephone calls with the IP telephony system 120 similar to mobile computing device 136A. In embodiments of the present invention, communications environment 100 may be used to establish voice based or data based telecommunications sessions between mobile computing device 136A and mobile computing device 136B, depending on various criteria associated with each of the mobile computing devices, as will be described below in more detail.

In the embodiments described above, a device may act as a mobile telephony device once it is configured with appropriate application software that may be downloaded from an app distribution platform 144. For example, mobile computing device 136A may download a VOIP mobile app from app distribution platform 144 and install the VOIP mobile app on mobile computing device 136A.

Figure 2:
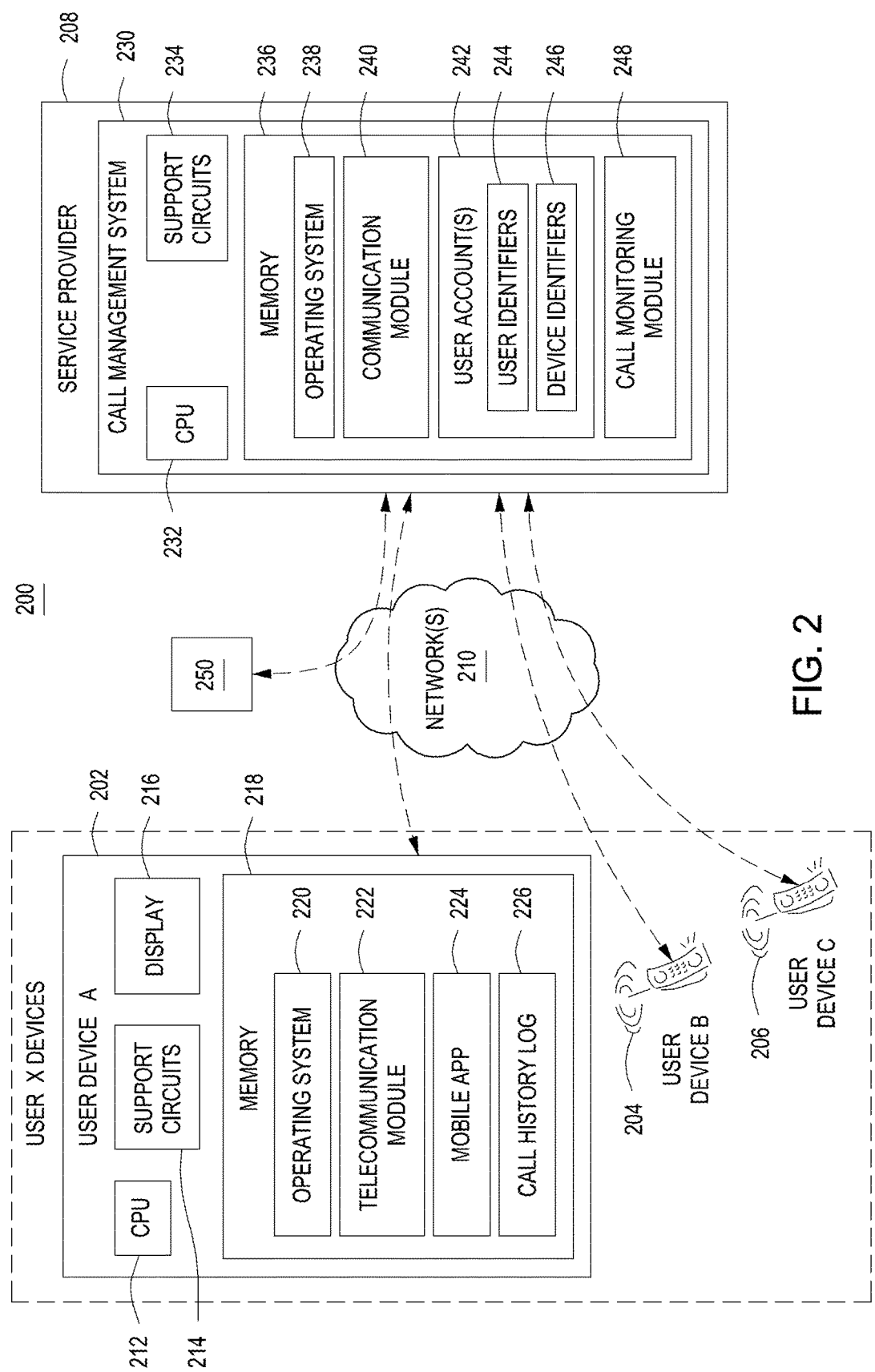
FIG. 2 depicts a block diagram of a system for managing incoming calls to multi-device accounts, according to one or more embodiments of the invention.

FIG. 2 depicts a block diagram of a system 200 for managing incoming calls to linked devices on multi-device accounts, according to one or more embodiments. The system 200 comprises multiple user devices, such as user devices 202, 204 and 206, and service provider system 208 communicatively coupled via networks 210. In some embodiments, user devices 202, 204 and 206 may be devices 136A, 136B, 102, 106, 108 and/or 109 associated with a user as described above in FIG. 1, and service provider system 208 may be IP telephony system 120 as described above in FIG. 1.

Each user device 202, 204 and 206 may comprise a Central Processing Unit (CPU) 212, support circuits 214, a display device 216, and a memory 218. The CPU 212 may comprise one or more commercially available microprocessors or microcontrollers that facilitate data processing and storage. The various support circuits 214 facilitate the operation of the CPU 212 and include one or more clock circuits, power supplies, cache, input/output device and circuits, and the like. The memory 218 comprises at least one of Read Only Memory (ROM), Random Access Memory (RAM), disk drive storage, optical storage, removable storage and/or the like. In some embodiments, the memory 218 comprises an operating system 220, a telecommunication module 222, a mobile app 224, such as a mobile telecommunication app, and a call history log 226.

The operating system (OS) 220 generally manages various computer resources (e.g., network resources, file processors, and/or the like). The operating system 220 is configured to execute operations on one or more hardware and/or software modules, such as Network Interface Cards (NICs), hard disks, virtualization layers, firewalls and/or the like. Examples of the operating system 220 may include, but are not limited to, various versions of LINUX, MAC OSX, BSD, UNIX, MICROSOFT WINDOWS, IOS, ANDROID and the like. In some embodiments, operating system 220 may include an application programming interface (API) which can be used to access and user device information and features (such as, for example, by mobile app 224).

In some embodiments, the mobile app 224 is a VoIP app that provides over-the-top (OTT) VoIP telephony services to an end-user. In some embodiments, an end-user may download the mobile app 224 from service provider system 208, or from an app distribution system 144, and install the mobile app 224 on their device. Although the mobile app 224 is described herein as a separate stand-alone application, in some embodiments the mobile app 224 may be integrated into OS 220, and may use existing API calls provided by the OS 220 to access or control various features of user devices 202, 204, and 206.

Telecommunication module 222 may be used to facilitate, or otherwise provide, communication connection services such as, for example, voice or video calling, or various other types of communication services provided by a service provider 208. In some embodiments of the invention, such communication connection may be a standard 3G/4G mobile communication connection established using telecommunication module 222. In some embodiments, the communication connection may be a Wi-Fi connection. Those skilled in the art of wireless communications know that other types of communication connections/environments exist and can be readily accessed with the appropriate types of hardware and signaling protocols and are considered within the scope of the invention. For example Bluetooth, WiMax and other, less known networks may be used. In addition, although described in terms of wireless communications, the inventive features of embodiments described herein can also apply to devices connecting to a LAN using wired technology.

The networks 210 comprise one or more communication systems that connect computers by wire, cable, fiber optic and/or wireless link facilitated by various types of well-known network elements, such as hubs, switches, routers, and the like. The networks 210 may include an Internet Protocol (IP) network (such as internet 110 of FIG. 1), a public switched telephone network (PSTN) (such as the PSTN network of PSTN provider 130 of FIG. 1), or other mobile communication networks, and may employ various well-known protocols to communicate information amongst the network resources.

In some embodiments, service provider system 208 may be a communication service provider, such as a VoIP service provider, that includes and maintains call management system 230. In other embodiments, call management system 230 may be a separate entity that provides call management services to service provider system 208, or to individual users, by agreement. Service provider system 208 may include call management system 230 that may be used to managing incoming calls to multi-device accounts. The call management system 230 may include a Central Processing Unit (CPU) 232, support circuits 234, and memory 236. The CPU 232 may comprise one or more commercially available microprocessors or microcontrollers that facilitate data processing and storage. The various support circuits 234 facilitate the operation of the CPU 232 and include one or more clock circuits, power supplies, cache, input/output circuits, and the like. The memory 236 comprises at least one of Read Only Memory (ROM), Random Access Memory (RAM), disk drive storage, optical storage, removable storage and/or the like. In some embodiments, the memory 236 comprises an operating system 238, communication module 240, user accounts 242, and a call monitoring module 248. The operating system (OS) 238 generally manages various computer resources (e.g., network resources, file processors, and/or the like). The operating system 238 is configured to execute operations on one or more hardware and/or software modules, such as Network Interface Cards (NICs), hard disks, virtualization layers, firewalls and/or the like. Examples of the operating system 238 may include, but are not limited to, various versions of LINUX, MAC OSX, BSD, UNIX, MICROSOFT WINDOWS, IOS, ANDROID and the like.

Each user account 242 is associated with a communication identifier 244. The communication identifier 244 uniquely identifies the user and is uniquely associated with each user account 242. Each user account 242 also includes one or more device identifiers 246. Each device identifier 246 may be an International Mobile Equipment Identity (IMEI), a media access control (MAC) address, International mobile subscriber identity (IMSI), Integrated circuit card identifier (ICCID), serial number, or any identifier or combination of identifiers that uniquely identifies the user device. In some embodiments, each device identifier 246 is associated with a registered IP address, for example, through Session Initiation Protocol (SIP) registration.

In operation, an incoming communication request originated from a telephony device 250 may be received by the service provider 208 to establish a call with user X. The communication request includes user X's communication identifier 244 (e.g., a telephone number assigned to user X). The communication module 240 accesses the user accounts 242 to determine which devices are associated with user X's account to direct the incoming call to. For example, as shown in FIG. 2, user X has three linked devices associated with their account, user device A 202, user device B 204, and user device C 206.

The communication module 240 transmits the communication request to each of the user devices associated with the user account 242. For example, the communication module 240 transmits the communication request to user device A 202, user device B 204, and user device C 206. In some embodiments, the communication request may be transmitted to each of the user devices simultaneously. In some embodiments, where, for example, a number of user devices exceeds a maximum number of allowed concurrent calls, the communication request may be transmitted to a plurality of most active user devices. In other embodiments, the communication requests may be transmitted, for example, sequentially, based on waiting a predetermined time between trying each user device in the sequence. In a VoIP network, the call request oftentimes takes the form of a Session Initiation Protocol (SIP) INVITE message sent from call management system 230 and directed towards the communication identifier 244. In a VoIP network, the call management system 230 may be, for example, a SIP Proxy Network. The details and functionality of SIP can be found in the Internet Engineering Task Force (IETF) Request for Comments (RFC) Paper No. 3261 entitled, "SIP: Session Initiation Protocol" herein incorporated in its entirety by reference. The SIP INVITE message may cause the user devices 202, 204, and 206 to alert a user that a call is incoming, for example, by ringing. When the call request is accepted by one of the user devices associated with the user account, for example by user device A 202, a SIP OK message is sent from the user device A 202 (e.g., via mobile app 224 or telecommunication module 222), back to the service provider 208. That is, user device A 202 sends a SIP OK message to call management system 230 indicating that call management system 230 is ready for voice communication with telephony device 250. In some embodiments, a user may select on, for example, user device A 202, to forward the call request to a voicemail system (not shown). In such embodiments, the call request is considered to be accepted by the user device, in the present example, user device A 202.

After establishing the call between telephony device 250 and user device A 202, the communication module 240 sends a message, for example, a SIP CANCEL message, to all of user X's other registered devices that did not accept the communication request, for example user device B 204 and user device C 206. The SIP CANCEL message causes the user devices 204 and 206 to stop alerting the user of the call request (i.e., instructs the user devices 204 and 206 to stop ringing). In other words, the SIP CANCEL message is an instruction to terminate the pending communication request.

In some embodiments, the mobile apps 224 on user device B 204 and user device C 206 may log a missed call in the call history log 226 after receiving the SIP CANCEL message, or an equivalent indication. The call management system 230 may also send an indication that the communication request was accepted by the first device in the form of a call status message. In some embodiments, the indication that the communication request was accepted by the first device may be included in the body or in a header field of the SIP CANCEL message (i.e., the SIP CANCEL message is also the call status message). In other embodiments, the call status message including the indication that the communication request was accepted by the first device may be sent in a second separate message, such as a separate SIP message, User Datagram Protocol (UDP) datagram, Hypertext Transfer Protocol (HTTP) message, and the like.

Upon receipt of a status message, user device B and user device C will update their call history log 226 accordingly indicating that the call was answered. In some embodiments, the call history log 226 may also include an identifier of the device that was used to answer the call (i.e., to accept the communication request.) For example, the call history log 226 records an entry of "missed call" and upon receipt of a status message after the call is complete, updates the entry to read, for example, "call completed by device A".

In some embodiments, the mobile apps 224 on user device B 204 and user device C 206 may log a missed call in the call history log 226 and update the call history log 226 in real time. For example, upon receipt of status messages from the call monitoring module 248, the mobile app 224 updates the call history log 226 with status updates, for example, "call in progress with device A", "call redirected to voicemail by device A", "call completed at time X", and the like.

In some embodiments, additional call details are received from the call monitoring module 248 and recorded in the call history log 226. The additional call details may include a call time, a call duration, and the like.

In some embodiments, where the communication requests are transmitted sequentially, to one user device at a time, an SIP INVITE message is transmitted to a first user device, for example, user device A 202. If there is no response after X seconds, a SIP CANCEL message is transmitted to the user device, in the present example, user device A 202. An SIP INVITE message is then transmitted to a second user device associated with the user account, for example, user device B 204 and iterates until a user device accepts the communication request or all user devices are exhausted. When a user device accepts the call request, the remaining user devices associated with the user account are sent one or more call status messages which may be recorded in the call history log 226.

Figure 3:
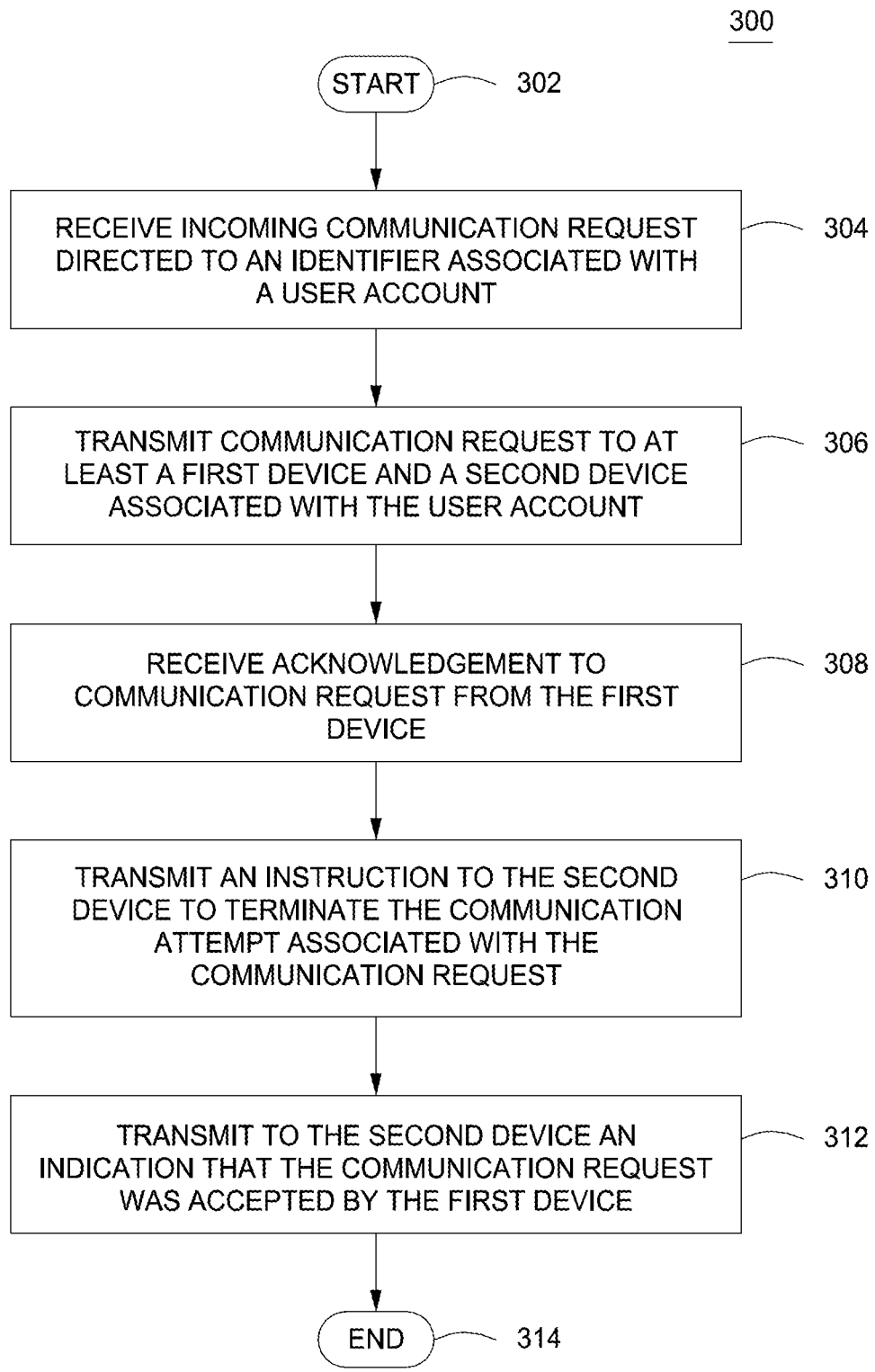
FIG. 3 depicts a flow diagram of a method for managing incoming calls to multi-device accounts, according to one or more embodiments of the subject invention.

FIG. 3 depicts a flow diagram of a method 300 for managing incoming calls to multi-device accounts, according to one or more embodiments of the subject invention. The method 300 is performed by the call management system 230 on service provider 208. The method 300 starts at 302 and proceeds to 304.

At 304, an incoming communication request is received at a service provider, for example a VoIP service provider. The communication request is directed to an identifier associated with a user account. The user account may be associated with an individual, or a group of individuals, for example, a family or a group of employees for a business. The user account is associated with two or more user devices. Device identifiers for each of the two or more user devices are retrieved from the user account. The device identifier may be an International Mobile Equipment Identity (IMEI), a media access control (MAC) address, a Unique Device Identifier (UDID), an ANDROID ID, a Mobile Equipment Identifier (MEID), or any identifier that uniquely identifies the device.

At 306, the communication request is transmitted to each of the two or more user devices, for example, to at least a first device and a second device. In some embodiments, if a number of user devices exceeds a maximum allowable concurrent calls for a user account, the communication request may be transmitted to a number of, for example, most active devices of the user account, the number of most active devices as to not exceed the maximum allowable concurrent calls for the user account. In some embodiments, the communication request may be in the form of an SIP INVITE message. Upon receipt of the SIP INVITE message, each of the devices typically alerts the user of an incoming call, by for example, ringing, vibrating, etc. Each of the devices may respond to the SIP INVITE with a SIP 180 Ringing message to inform the call management system and the calling party that the devices are ringing.

At 308, an acknowledgement to the communication request is received from one of the user's two or more devices, for example, from the first device. The acknowledgement may be a SIP OK message sent by the first device to the service provider.

At 310, an instruction is sent to the user's devices that did not accept the communication request, for example, to the second user device. The instruction instructs the user device to cancel the communication attempt associated with the communication request. The instruction may be a SIP CANCEL message. It may occur that the second user device also accepts the call request after the first user device accepted the call request but before the SIP CANCEL message is received. In such case, the first user device is connected to the calling party and the second user device is sent the SIP CANCEL message. Upon receipt of the SIP CANCEL message each of the user devices, stops alerting the user of an incoming call. For example, the user device may stop ringing. In addition, upon receipt of the SIP CANCEL message, each user device may log a call history record that there was a missed call.

At 312, an indication is sent to the user devices that did not accept the communication request, for example, the second user device. The indication is a status message that indicates that another of the user devices accepted the communication request. In some embodiments, the status message/indication may be a HyperText Transfer Protocol (HTTP) message, UDP message, or any TCP protocol message, such as FTP, SMTP, IMAP, and the like. The indication may include an identifier of the user device that accepted the communication request. In some embodiments, the indication includes call details for the communication associated with the communication request. For example, the call details may include a call time, a call duration, and the like. In some embodiments, the indication is sent after the call is complete. In some embodiments, multiple indications are sent in order to provide real-time status information regarding the call, for example, "Call in progress with user device A", "call completed by user device A", and the like. Upon receipt of the indications, the user devices may update their call history logs as described in further detail with respect to FIG. 5 below. The method 300 ends at 314.

Figure 4:
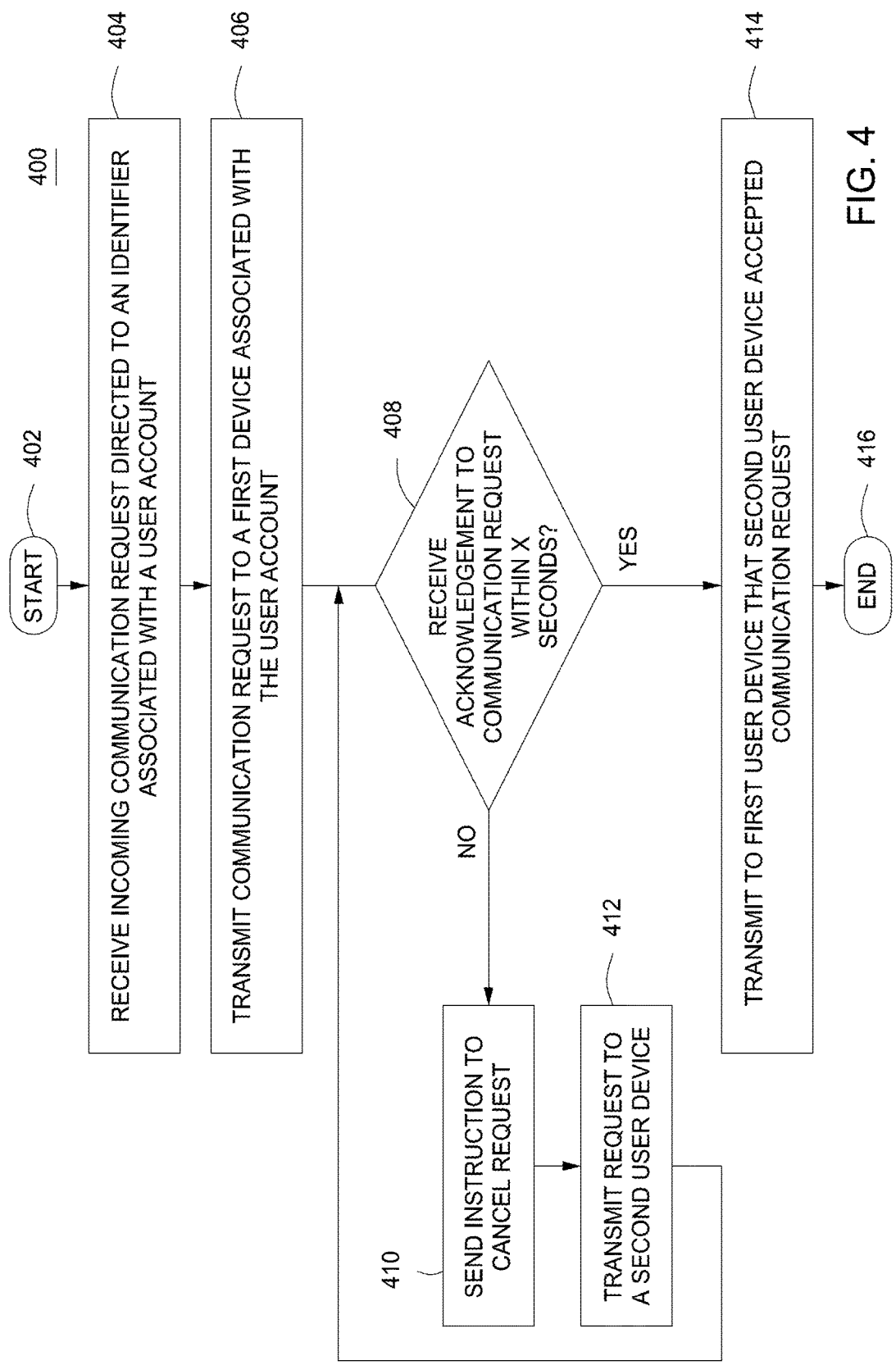
FIG. 4 depicts a flow diagram of a method for managing incoming calls to multi-device accounts, according to one or more embodiments of the subject invention.

FIG. 4 depicts a flow diagram of a method 400 for managing incoming calls to multi-device accounts, according to one or more embodiments of the subject invention. The method 400 is performed by the call management system 230 on service provider 208. The method 400 starts at 402 and proceeds to 404.

At 404, an incoming communication request is received at a service provider, for example a VoIP service provider. The communication request is directed to an identifier associated with a user account. The user account may be associated with an individual, or a group of individuals, for example, a family or a group of employees for a business. The user account is associated with two or more user devices. Device identifiers for each of the two or more user devices are retrieved from the user account. The device identifier may be an International Mobile Equipment Identity (IMEI), a media access control (MAC) address, a Unique Device Identifier (UDID), an ANDROID ID, a Mobile Equipment Identifier (MEID), or any identifier that uniquely identifies the device.

At 406, the communication request is transmitted to a first user device of the two or more user devices. In some embodiments, the communication request may be in the form of an SIP INVITE message. Upon receipt of the SIP INVITE message, the user device typically alerts the user of an incoming call, by for example, ringing, vibrating, etc. The device may respond to the SIP INVITE with a SIP 180 Ringing message to inform the call management system and the calling party that the device is ringing.

At 408, it is determined whether an acknowledgement to the communication request is received from the user device within a predefined number of seconds, such as X seconds. The acknowledgement may be a SIP OK message sent by the user device to the service provider. If an acknowledgement was received within X seconds, the method 400 proceeds to step 414. However, if an acknowledgement was not received within X seconds, the method 400 proceeds to step 410.

At step 410, an instruction is sent to the user device. The instruction instructs the user device to cancel the communication attempt associated with the communication request. The instruction may be a SIP CANCEL message. Upon receipt of the SIP CANCEL message, the user device stops alerting the user of an incoming call. For example, the user device may stop ringing. In addition, upon receipt of the SIP CANCEL message, the user device may log a call history record that there was a missed call and the method 400 proceeds to step 412.

At step 412, the communication request is sent to a second user device associated with the user account and the method proceeds to step 408 and iterates until a user device associated with the user account accepts the communication request within X seconds at which time the method 400 proceeds to step 414. In the event that no user device associated with the user account accepts the communication request, the call request is cancelled.

At 414, an indication is sent to the user devices associated with the user account that did not accept the communication request. The indication is a status message that indicates that another of the user devices accepted the communication request. In some embodiments, the status message/indication may be a HyperText Transfer Protocol (HTTP) message, UDP message, or any TCP protocol message, such as FTP, SMTP, IMAP, and the like. The indication may include an identifier of the user device that accepted the communication request. In some embodiments, the indication includes call details for the communication associated with the communication request. For example, the call details may include a call time, a call duration, and the like. In some embodiments, the indication is sent after the call is complete. In some embodiments, multiple indications are sent in order to provide real-time status information regarding the call, for example, "Call in progress with user device A", "call forwarded to voicemail by user device A", "call completed by user device A", and the like. Upon receipt of the indications, the user devices may update their call history logs as described in further detail with respect to FIG. 5 below. The method 400 ends at 416.

Figure 5:
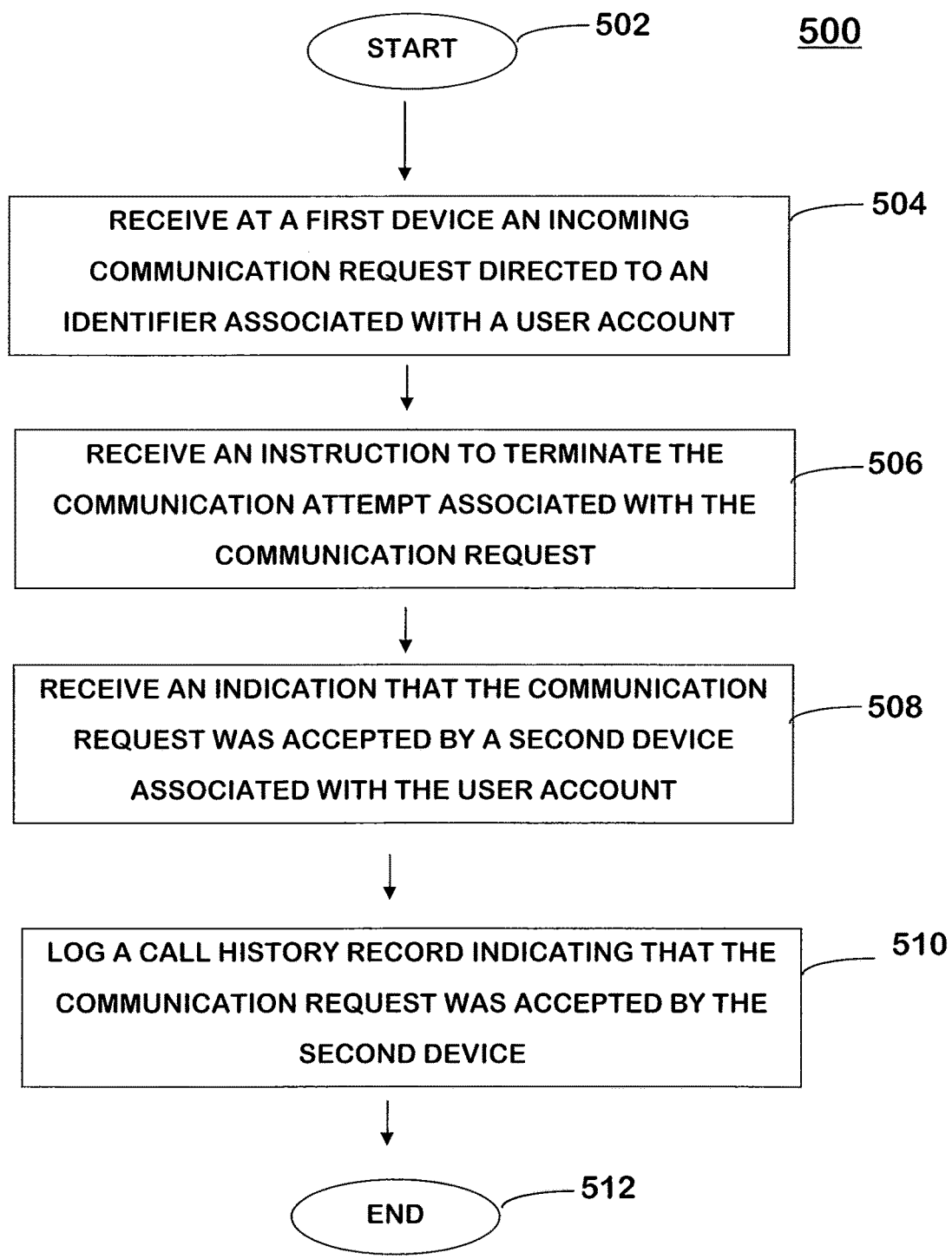
FIG. 5 depicts a flow diagram of a method for logging a call history record of incoming calls to a multi-device account, according to one or more embodiments of the subject invention.

FIG. 5 depicts a flow diagram of a method 500 for logging a call history record of an incoming call to a multi-device account, according to one or more embodiments of the subject invention. The method 500 may be performed by the mobile app 224 on a mobile device 202 of FIG. 2. The method 500 starts at 502 and proceeds to 504.

At 504, an incoming communication request is received at a first device. The communication request may be in the form of, for example, a SIP INVITE message. Receipt of the communication request causes the device to alert a user of the device, for example, by ringing, vibrating, etc. The communication request was sent to the first device as well as to one or more other devices associated with an account of the user.

At 506, an instruction is received to terminate the communication attempt associated with the communication request. The instruction may be in the form of, for example, a SIP CANCEL message. Upon receipt of the instruction to terminate the communication attempt, the alert to the user stops, for example, the device stops ringing. In some embodiments, a missed call is entered into a call history log.

At 508, an indication is received in the form of a call status message from, for example, the service provider that the communication was accepted by a user device other than the first device, for example a second device associated with the user account. In some embodiments, the indication may be a HyperText Transfer Protocol (HTTP) message, UDP message, or any TCP protocol, such as FTP, SMTP, IMAP, and the like. The indication may specifically identify the user device that accepted the communication request. In some embodiments, the indication includes call details for the communication associated with the communication request. For example, the call details may include a call time, a call duration, and the like. In some embodiments, the indication is sent after the call is complete indicating the user device that accepted the communication request and may include call details. In some embodiments, multiple indications are sent during the call in order to provide real-time status information, for example, "Call in progress with user device A", "call completed by user device A", and the like.

At 510, a call history record is created/updated, in for example, call history log 226. The call history record is updated to reflect the information received in the indication.

The call history record indicates at least that the call was accepted by another user device associated with the user account. The call history record may include the specific user device that accepted the communication request. The call history record reflects the true status of the call associated with the communication request, rather than merely a missed call. In some embodiments, the call history record is updated as each indication is received in order to reflect the call status in real time. The method 500 ends at 512.

The embodiments of the present invention may be embodied as methods, apparatus, electronic devices, and/or computer program products. Accordingly, the embodiments of the present invention may be embodied in hardware and/or in software (including firmware, resident software, microcode, and the like), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus or device. More specific examples (a non-exhaustive list) of the computer-readable medium include the following: hard disks, optical storage devices, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java®, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

Figure 6:
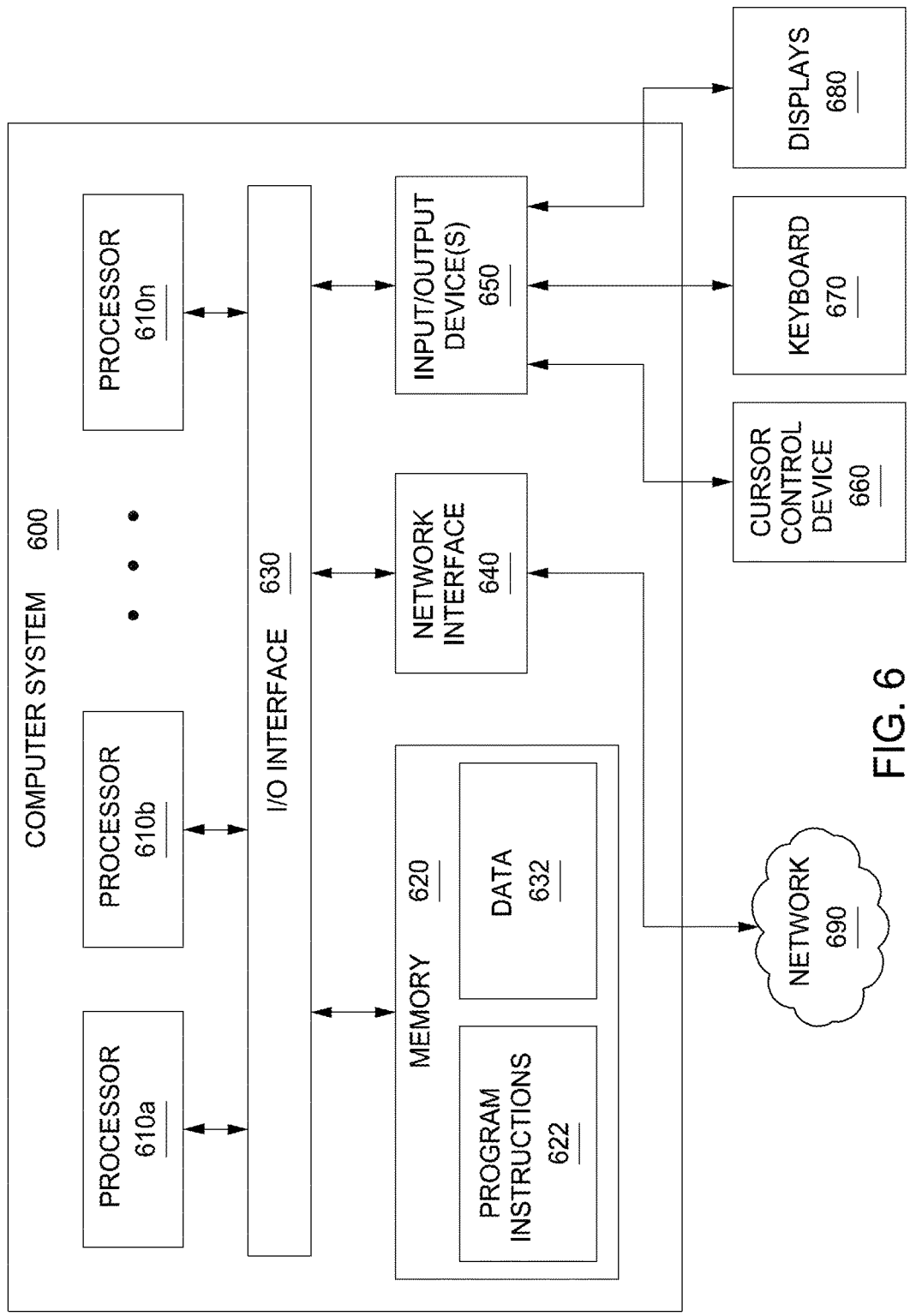
FIG. 6 depicts a computer system that can be utilized in various embodiments of the present invention, according to one or more embodiments of the invention.

FIG. 6 depicts a computer system 600 that can be utilized in various embodiments of the present invention to implement the computer and/or the display, according to one or more embodiments.

Various embodiments of method and apparatus for organizing, displaying and accessing contacts in a contact list, as described herein, may be executed on one or more computer systems, which may interact with various other devices. One such computer system is computer system 600 illustrated by FIG. 6, which may in various embodiments implement any of the elements or functionality illustrated in FIGS. 1-5. In various embodiments, computer system 600 may be configured to implement methods described above. The computer system 600 may be used to implement any other system, device, element, functionality or method of the above-described embodiments. In the illustrated embodiments, computer system 600 may be configured to implement the methods 300, 400, and 500 as processor-executable executable program instructions 622 (e.g., program instructions executable by processor(s) 610) in various embodiments.

In the illustrated embodiment, computer system 600 includes one or more processors 610*a*-610*n* coupled to a system memory 620 via an input/output (I/O) interface 630. Computer system 600 further includes a network interface 640 coupled to I/O interface 630, and one or more input/output devices 650, such as cursor control device 660, keyboard 670, and display(s) 680. In various embodiments, any of the components may be utilized by the system to receive user input described above. In various embodiments, a user interface may be generated and displayed on display 680. In some cases, it is contemplated that embodiments may be implemented using a single instance of computer system 600, while in other embodiments multiple such systems, or multiple nodes making up computer system 600, may be configured to host different portions or instances of various embodiments. For example, in one embodiment some elements may be implemented via one or more nodes of computer system 600 that are distinct from those nodes implementing other elements. In another example, multiple nodes may implement computer system 600 in a distributed manner.

In different embodiments, computer system 600 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In various embodiments, computer system 600 may be a uniprocessor system including one processor 610, or a multiprocessor system including several processors 610 (e.g., two, four, eight, or another suitable number). Processors 610 may be any suitable processor capable of executing instructions. For example, in various embodiments processors 610 may be general-purpose or embedded processors implementing any of a variety of instruction set architectures (ISAs). In multiprocessor systems, each of processors 610 may commonly, but not necessarily, implement the same ISA.

System memory 620 may be configured to store program instructions 622 and/or data 632 accessible by processor 610. In various embodiments, system memory 620 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 620. In other embodiments, program instructions and/or data may be received, sent or stored upon different types of computer-accessible media or on similar media separate from system memory 620 or computer system 600.

In one embodiment, I/O interface 630 may be configured to coordinate I/O traffic between processor 610, system memory 620, and any peripheral devices in the device, including network interface 640 or other peripheral interfaces, such as input/output devices 650. In some embodiments, I/O interface 630 may perform any necessary protocol, timing or other data transformations to convert data signals from one component (e.g., system memory 620) into a format suitable for use by another component (e.g., processor 610). In some embodiments, I/O interface 630 may include support for devices attached through various types of peripheral buses, such as a variant of the Peripheral Component Interconnect (PCI) bus standard or the Universal Serial Bus (USB) standard, for example. In some embodiments, the function of I/O interface 630 may be split into two or more separate components, such as a north bridge and a south bridge, for example. Also, in some embodiments some or all of the functionality of I/O interface 630, such as an interface to system memory 620, may be incorporated directly into processor 610.

Network interface 640 may be configured to allow data to be exchanged between computer system 600 and other devices attached to a network (e.g., network 690), such as one or more external systems or between nodes of computer system 600. In various embodiments, network 690 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 640 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

Input/output devices 650 may, in some embodiments, include one or more display terminals, keyboards, keypads, touchpads, scanning devices, voice or optical recognition devices, or any other devices suitable for entering or accessing data by one or more computer systems 600. Multiple input/output devices 650 may be present in computer system 600 or may be distributed on various nodes of computer system 600. In some embodiments, similar input/output devices may be separate from computer system 600 and may interact with one or more nodes of computer system 600 through a wired or wireless connection, such as over network interface 640.

In some embodiments, the illustrated computer system may implement any of the operations and methods described above, such as the methods illustrated by the flowcharts of FIG. 3, FIG. 4, and FIG. 5. In other embodiments, different elements and data may be included.

Those skilled in the art will appreciate that computer system 600 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, and the like. Computer system 600 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 600 may be transmitted to computer system 600 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, and the like), ROM, and the like.

The methods described herein may be implemented in software, hardware, or a combination thereof, in different embodiments. In addition, the order of methods may be changed, and various elements may be added, reordered, combined, omitted or otherwise modified. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A computer implemented method for communication history reconciliation amongst linked devices, comprising:
    receiving an incoming communication request directed to a communication identifier associated with a user account;
    transmitting the communication request to at least a first device and a second device associated with the user account, wherein the communication request is transmitted to the at least first device and second device at the same time;
    receiving, responsive to the communication request, a message from the first device indicating that the first device has accepted the communication request to establish a call; and
    transmitting, to the second device, an indication that the communication request was accepted by the first device, wherein the indication is included in a SIP CANCEL message, and wherein the indication includes which of the at least first device and second device accepted the communication request.

2. The method of claim 1, wherein after receiving the message from the first device indicating that the first device has accepted the communication request, the method further comprises:
    transmitting, to the second device an instruction to terminate a communication attempt associated with the communication request.

3. The method of claim 1, wherein transmitting the communication request to at least a first device and a second device associated with the user account comprises:
    transmitting the communication request to the second device;
    transmitting to the second device an instruction to terminate a communication attempt associated with the communication request when an acceptance of the communication request is not received from the second device within a predefined number of seconds; and
    transmitting the communication request to the first device.

4. The method of claim 1, further comprising:
    transmitting to the second device a device identifier of the first device.

5. The method of claim 1, further comprising:
    transmitting, to the second device, call details associated with the call established with the first device.

6. The method of claim 5, wherein the call details comprise at least one of a call time or a call duration.

7. The method of claim 1, further comprising:
    transmitting, to the second device, real-time status messages associated with the call established with the first device, wherein the real-time status messages include at least one of an indication that the call is in progress, that the call was sent to voicemail, or that the call has been completed.

8. The method of claim 1, wherein the message from the first device is a Session Initiation Protocol (SIP) OK message indicating that the first device is ready for voice communication.

9. The method of claim 1, wherein receiving, responsive to the communication request, a message from the first device indicating that the first device has accepted the communication request to establish a call, comprises receiving a message indicating that the first device has directed the communication request to a voicemail system.

10. A computer implemented method for communication history reconciliation amongst linked devices, comprising:
    receiving, at a first device associated with a user account, an incoming communication request directed to a communication identifier associated with the user account, wherein the communication request is received at a second device associated with the user account at a same time;
    receiving an instruction to terminate the communication request;
    receiving an indication that the communication request was accepted by the second device associated with the user account and the communication identifier, wherein the indication is included in a SIP CANCEL message, and wherein the indication includes which of the first device and second device accepted the communication request; and
    generating a call history record to indicate that the communication request was accepted by the second device.

11. The method of claim 10, wherein the indication comprises a unique device identifier of the second device.

12. The method of claim 10, further comprising:
    storing a missed call entry in a call history log upon receipt of the instruction to terminate the communication request.

13. The method of claim 10, further comprising:
    receiving an indication that a call associated with the communication request is in progress; and
    updating the call history record to indicate that the call is in progress.

14. The method of claim 13, further comprising:
    receiving an indication that the call was completed by the second device; and
    updating the call history record to indicate the call was completed by the second device.

15. The method of claim 10, further comprising:
    receiving call details regarding a call associated with the communication request; and
    updating the call history record to include the received call details.

16. The method of claim 15, wherein call details include at least one of a call time or a call duration.

17. A system for communication history reconciliation amongst linked devices, comprising:
    a communication module configured to:
        receive an incoming communication request directed to a communication identifier associated with a user account;
        transmit the communication request to at least a first device and a second device associated with the user account, wherein the communication request is transmitted to the at least first device and second device at the same time; and
        receive, responsive to the communication request, a message from the first device indicating that the first device has accepted the communication request to establish a call; and
    a call monitoring module configured to:
    transmit, to the second device, an indication that the communication request was accepted by the first device, wherein the indication is included in a SIP CANCEL message, and wherein the indication includes which of the at least first device and second device accepted the communication request.

18. The system of claim 17, wherein the communication module is further configured to transmit, to the second device an instruction to terminate a communication attempt associated with the communication request after receiving the message from the first device indicating that the first device has accepted the communication request.

19. The system of claim 17, wherein the communication module is further configured to transmit to the second device a device identifier of the first device.

20. The system of claim 17, wherein the call monitoring module is further configured to transmit to the second device call details associated with the call established with the first device, and wherein call details comprise at least one of a call time or a call duration.

21. The system of claim 17, wherein the call monitoring module is further configured to transmit to the second device real-time status messages during the call associated with the communication request, and wherein the real-time status messages include at least one of an indication that the call is in progress, that the call was sent to voicemail, or that the call has been completed.

22. A system for communication history reconciliation amongst linked devices, comprising:
a first device, wherein the first device is associated with a communication identifier associated with a user account, and wherein the first device is configured to:
receive an incoming communication request directed to the communication identifier, wherein the communication request is received at a second device associated with the user account at a same time;
receive an instruction to terminate the communication request;
receive an indication that the communication request was accepted by the second device associated with the user account, wherein the indication is included in a SIP CANCEL message, and wherein the indication includes which of the at least first device and second device accepted the communication request; and
generate a call history record to indicate that the communication request was accepted by the second device.

23. The system of claim 22, wherein the indication comprises a unique identifier of the second device.

24. The system of claim 22, wherein the first device is further configured to:
store a missed call entry in a call history log upon receipt of the instruction to terminate the communication request.

25. The system of claim 22, wherein the first device is further configured to:
receive call details regarding a call associated with the communication request; and
update the call history record to include the received call details.

* * * * *